United States Patent [19]

Strasser

[11] Patent Number: 5,543,238
[45] Date of Patent: Aug. 6, 1996

[54] FUEL CELL AND METHOD FOR MOISTENING THE ELECTROLYTE OF THE FUEL CELL

[75] Inventor: Karl Strasser, Erlangen, Germany

[73] Assignee: Siemens Aktiengesellschaft, Munich, Germany

[21] Appl. No.: 383,721

[22] Filed: Feb. 3, 1995

Related U.S. Application Data

[63] Continuation of PCT/DE92/00661, Aug. 10, 1992.

[51] Int. Cl.$^6$ .................................................. H01M 8/04
[52] U.S. Cl. .............................. 429/17; 429/21; 429/30; 429/34
[58] Field of Search ...................... 429/17, 19, 23, 429/13, 21, 34, 30, 33

[56] References Cited

U.S. PATENT DOCUMENTS

| | | |
|---|---|---|
| 4,362,789 | 12/1982 | Dighe . |
| 4,769,297 | 9/1988 | Reiser et al. ............................. 429/17 |
| 4,859,545 | 8/1989 | Scheffler et al. . |

FOREIGN PATENT DOCUMENTS

| | | |
|---|---|---|
| 2533215 | 12/1979 | Germany . |
| 4021097 | 1/1992 | Germany . |
| 9213365 | 8/1992 | WIPO . |

OTHER PUBLICATIONS

Fuel Cell Handbook, New York, 1989, pp. 1–7, 440–454 and 543–553 (APPLEBY and FOULKES); (Month not req'd).
VDI Reports No. 912, 1992, pp. 125–145, (STRASSER) "Brennstoffzellen für Elektrotraktion"; (Month not available).

Primary Examiner—Anthony Skapars
Attorney, Agent, or Firm—Herbert L. Lerner; Laurence A. Greenberg

[57] ABSTRACT

A fundamental problem which exists in fuel cells having an electrolyte that conducts oxygen ions, hydroxide ions or protons, is that of moistening air of combustion gases for preventing the electrolyte from drying out or thinning and thus preventing defective operation of the fuel cell during air operation. The construction and financial cost, in particular, for moistening of the air is of concern in such a device. In a low-temperature fuel cell, in particular a PEM fuel cell, and a method for moistening the electrolyte of the fuel cell, according to the invention, that disadvantage is avoided by providing that exhaust gas which occurs on the cathode side of the fuel cell is at least partially recirculated into the cathode of the fuel cell. Consequently, the water content of the electrolyte can be set within wide limits by simple adjustment of the recirculated exhaust-gas quantity. Therefore, economical use of the PEM fuel cell becomes possible. The invention can be used in principle for all fuel cells having an electrolyte which conducts oxygen ions, hydroxide ions or protons.

12 Claims, 1 Drawing Sheet

FUEL CELL AND METHOD FOR MOISTENING THE ELECTROLYTE OF THE FUEL CELL

CROSS-REFERENCE TO RELATED APPLICATION

This application is a Continuation of International Application Ser. No. PCT/DE92/00661, filed Aug. 10, 1992.

BACKGROUND OF THE INVENTION

Field of the Invention

The invention relates to a fuel cell, preferably a PEM fuel cell, and to a method for moistening the electrolyte of the fuel cell.

A fuel cell in general includes an electrically conductive current transfer plate, a cathode, an intermediate layer which conducts ions, an anode and a further electrically conductive current transfer plate, all of which are stacked on one another in the stated sequence as flat plates. Fuel cells of that construction are already known, inter alia, from the "Fuel Cell Handbook" by Appleby and Foulkes, New York, 1989 and from an article by K. Strasser entitled: "Brennstoffzellen für Elektrotraktion" [Fuel Cells for Electrical Traction], in VDI Reports No. 912, 1992, Pages 125 to 145. Since the fuel cell can convert chemically bonded energy directly into electrical energy, it makes it possible to convert fuels such as hydrogen, natural gas and biogas, for example, into electrical energy with a higher efficiency and in a more environmentally friendly manner than it is possible to do by using the previously known conventional thermal power stations having an efficiency which is limited by the so-called Carnot's process.

As a consequence of the above-mentioned documents, a polymer-electrolyte-membrane fuel cell (PEM fuel cell) is favored in conjunction with an electrical drive. That fuel cell type can be operated both with technically pure gases and with gases and air containing $CO_2$. The low operating temperature (<100° C.), the high power density, the favorable long-term behavior and the lack of a corrosive, liquid electrolyte, for example, are particularly advantageous for use in a vehicle. Corrosive liquid electrolytes are used, for example, in an acidic or alkaline fuel cell.

The water balance in the electrolyte during operation of the fuel cells represents a particular problem in the case of the fuel cells. The operability of the fuel cell is closely linked to the water content in the fuel cell and, in particular, in the electrolyte. An excessively high water content in the electrolyte leads to the available power from the fuel cell being reduced, as a result of the excessively high dilution of the electrolyte. An excessively low water content of the electrolyte likewise leads to the electrical power from the fuel cell being reduced as a result of the increase in the internal resistance. Furthermore, even in the case of the electrolyte partially drying out, gas breakdown and thus the formation of combustible gas mixtures, can occur. In the worst case, that leads to damage or destruction of the fuel cell in the event of combustion of the gas mixture.

A relatively costly vaporizer-condenser configuration has therefore already been proposed for adjusting the water content of the electrolyte in an acidic or alkaline fuel cell. In that configuration at least one of the gases flowing into the fuel cell is used to transport water vapor and, for that purpose, is also passed over a lukewarm water surface.

A PEM fuel cell, which is preferably operated with hydrogen and air, requires a vaporizer configuration for adjusting the water content in the membrane, which conducts protons. The dimensioning of the vaporizer configuration must be matched to the lowest system pressure since the maximum volume flows must be moistened in that case at a constant temperature and the largest material exchange areas are therefore required. When such a vaporizer configuration is used, the relatively large physical volume, which can reach the size of the actual fuel cell block, and the high investment costs linked thereto, must be accepted as disadvantages. When using a PEM fuel cell, those disadvantages are so serious that they preclude use, especially mobile use, and thus wider application of such fuel cells.

SUMMARY OF THE INVENTION

It is accordingly an object of the invention to provide a low-temperature fuel cell, in particular a PEM fuel cell, and a method for moistening the electrolyte of the fuel cell, which overcome the hereinafore-mentioned disadvantages of the heretofore-known devices and methods of this general type and which allow the fuel cell, in particular the PEM fuel cell, to be used from economical viewpoints.

With the foregoing and other objects in view there is provided, in accordance with the invention, a method for moistening an electrolyte of a low-temperature fuel cell, especially a polymer-electrolyte membrane (PEM) fuel cell, which comprises at least partially recirculating exhaust gas occurring on a cathode side of a fuel cell into the cathode of the fuel cell; and setting a part of the exhaust gas being recirculated by an adjusting element in proportion to a power output of the fuel cell.

The term "low-temperature fuel cells" means polymer-electrolyte membrane fuel cells, acidic fuel cells and alkaline fuel cells. However, a PEM fuel cell is referred to below without precluding the other two types mentioned above.

In consequence, a part of the water (product water) which is produced during the electrochemical reaction in the fuel cell is initially carried away with the other exhaust gas from the cathode of the PEM fuel cell and is then at least partially recirculated into the cathode of the PEM fuel cell, as a result of which the moisture level of the oxidation agent flowing into the cathode is raised and improved moistening of the electrolyte in the PEM fuel cell is ensured. The expression "supply of the oxidation agent to the cathode of the PEM fuel cell" in this case means not only the supply of the air oxygen from the surrounding air but also, alternatively, the supply of the technically pure oxygen.

With the objects of the invention in view, there is also provided a low-temperature, moistened-electrolyte fuel cell assembly, especially a low-temperature, moistened-electrolyte, polymer-electrolyte membrane (PEM) fuel cell assembly, comprising a fuel cell having an anode on an anode side and a cathode on a cathode side; an exhaust-gas line connected to the cathode side of the fuel cell for carrying exhaust gas; a recirculation line connected to the exhaust-gas line for recirculating at least a part of the exhaust gas occurring on the cathode side into the cathode of the fuel cell; and an adjusting element being associated with the recirculation line for recirculating a part of the exhaust gas being adjustable in proportion to a power output of the fuel cell.

In consequence it is possible for a part of the water and of the heat which are extracted from the cathode of the PEM fuel cell to be fed back into the cathode. The recirculated part of the exhaust gas can be adjusted by means of the adjusting element. The power output from the fuel cell can easily be determined by current and voltage measurement, with the material conversion of the fuel cell also rising in proportion to the power output as the power output from the fuel cell rises. The recirculated part of the exhaust gas can be set appropriately by using the adjusting element. This results in a moisture level of the polymer-electrolyte membrane (PEM), which is preferred for disturbance-free operation of the PEM fuel cell, being obtained all of the time.

In accordance with another feature of the invention, in order to again compress the recirculated part of the exhaust gas to the inlet air pressure on the cathode side, it is advantageous if the recirculation line opens through a gas compressor into an air supply line connected on the cathode side. In this case, the gas compressor need only compensate for a relatively small pressure difference between the cathode inlet and outlet, and compress relatively small air quantities.

In accordance with a further feature of the invention, there is provided an air compressor disposed in the air supply line upstream of the opening of the recirculation line into the air supply line, as seen in air flow direction in the air supply line.

In accordance with an added feature of the invention, there is provided an air supply line connected to the cathode side of the fuel cell, the recirculation line opening into the air supply line, a gas compressor disposed in the air supply line downstream of the opening of the recirculation line into the air supply line, and a restriction point disposed upstream of the opening of the recirculation line into the air supply line, as seen in air flow direction in the air supply line.

In accordance with a concomitant feature of the invention, there is provided an air supply line connected to the cathode side of the fuel cell, an air compressor disposed in the air supply line, an air jet compressor being supplied with compressed air from the air compressor and having an induction connecting piece, and a recirculation line opening into the induction connecting piece.

Other features which are considered as characteristic for the invention are set forth in the appended claims.

Although the invention is illustrated and described herein as embodied in a fuel cell and a method for moistening the electrolyte of the fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
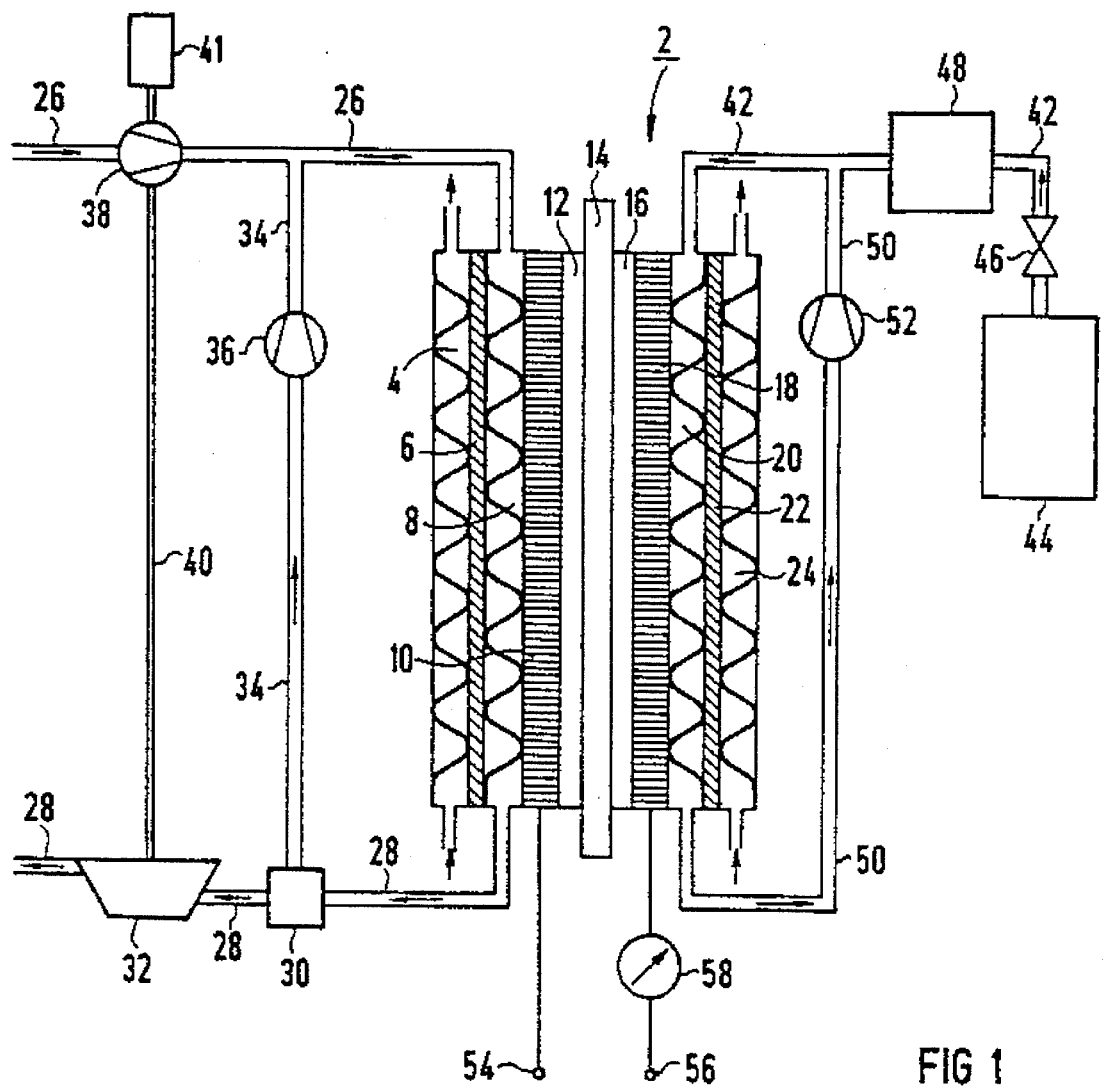
FIG. 1 is a diagrammatic view of a PEM fuel cell according to the invention with a schematic circuit diagram of a recirculation line for exhaust gas which occurs on the cathode side of the fuel cell.

Referring now to the figures of the drawing in detail and first, particularly, to FIG. 1 thereof, there is seen a fuel cell 2 which includes a cooling space or chamber 4, a spacer 6 on a cooling water side, an air gas space or chamber 8, a plate 10 on a cathode side made of carbon paper, a plate cathode 12, a PEM membrane 14 (which is commercially available, for example, under the name "NAFION 117"), a plate anode 16, a plate 18 on an anode side made of carbon paper, a hydrogen gas space or chamber 20, a spacer 22 on the cooling water side, and a cooling space or chamber 24, which are all stacked on one another in that sequence as flat plates. The cooling space 4 on the cathode side and the cooling space 24 on the anode side can be connected to a cooling water circuit, which is not illustrated in more detail. An air supply line 26 is connected to an input side of the air gas space 8, and an exhaust-gas line 28 is connected to an output side of the air gas space 8. The exhaust-gas line 28 leads to the open air through an adjusting element 30 and a relief turbine 32. A recirculation line 34, which opens through a gas compressor 36 into the air supply line 26, is connected to the adjusting element 30. An air compressor 38 is connected in the air supply line 26 in front of the opening of the recirculation line 34 into the air supply line 26, as is seen in the flow direction of the air. A part of the drive power of the air compressor 36 and of the further air compressor 38 is applied through a connection 40 from the exhaust-gas relief turbine 32. The connection 40 is only diagrammatically indicated in this case. The remaining drive power must be provided by a diagrammatically indicated motor 41.

A hydrogen supply line 42 is connected to an input side of the hydrogen gas space 20. This line 42 leads from a hydrogen source 44, through a valve 46 and a gas moistener 48 into the hydrogen gas space 20. A return line 50 for hydrogen is connected to an output side of the hydrogen space 20. The return line 50 opens through a gas compressor 52 into the hydrogen supply line 42 between the air moistener 48 and the hydrogen gas space 20.

During operation of the fuel cell 2, the hydrogen gas space 20 in the exemplary embodiment is acted on by a hydrogen partial pressure of approximately 2 bar. The air gas space 8 has air applied to it by means of the gas compressor 36 and the air compressor 38, with the static air pressure being approximately 1.3–4 bar a in the exemplary embodiment. In the cathode, the air oxygen molecules in each case are catalytically converted, with the absorption of four electrons, into two oxygen ions with double negative charges. The oxygen ions are passed to a boundary layer between the cathode 12 and the PEM 14. The electrons which are required for reduction of the oxygen are produced catalytically in the anode, on which two hydrogen molecules in each case are split into four hydrogen ions and four electrons. In this case, a voltage $U_{FC}$ of approximately 0.5–1 V, depending on the load current being set, is applied to a contact 54 which is connected to the carbon paper plate 10 on the cathode side, and to a contact 56 which is connected to the carbon paper plate 18 on the anode side.

If an electrical load is connected between the contacts 54 and 56, the electrons which become free in the anode flow through an ammeter 58 and a non-illustrated external electrical load, to the cathode 12. The fuel cell 2 then starts its correct operation and in so doing reaches a specific power up to approximately 700 mW/cm$^2$ and a current density of 1000 mA/cm$^2$. The operating temperature in this case is approximately 80° C. The hydrogen gas, which flows to the anode 16 through the hydrogen supply line 42, was previously passed through the gas moistener 48 and was moistened there, is partially consumed in the fuel cell, with electrons being released and water subsequently being formed. Since this water, which is also called product water, is formed virtually exclusively on the boundary surface between the cathode 12 and the PEM 14, that part of the hydrogen gas which is not consumed is passed into the hydrogen return line 50. The hydrogen gas, which is moistened with the product water, is subsequently passed through the gas compressor 52 again into the hydrogen supply line 42 and, as a result of its subsequently being introduced into the anode 16, prevents the PEM 14 from drying out on the boundary layer between the PEM 14 and the anode 16. In this case the consumed part of the hydrogen gas is supplemented from the hydrogen source 44 and is moistened by means of the gas moistener 48. The gas moistener 48 can be supplied with condensed water, which is obtained from the exhaust gas on the cathode side, in a manner that is not illustrated.

The product water which is produced on the cathode side is removed from the air gas space 8 with the air flow that is introduced into the exhaust-gas line 28 from the fuel cell 2. A part of the exhaust gas is introduced into the recirculation line 34 by means of the adjusting element 30, as a function of the output power from the fuel cell, and is supplied from there through the gas compressor 36 into the air supply line 26 again. In consequence, a part of the water which is produced on the boundary layer between the cathode 12 and the PEM 14 during the electrochemical reaction is also recirculated into the cathode 12, as a result of which the PEM 14 is prevented from drying out, and defective operation of the fuel cell 2 is thus prevented. When the fuel cell 2 is on full load, the recirculated air quantity is approximately half the exhaust-gas air quantity. Adequate moistening of the PEM 14 on the side of the cathode 12 is thus also ensured.

In the event of a required air ratio of $^A m \geq 2.5$ and in the event of half the exhaust-air quantity being returned, the total air quantity conveyed through the air gas space is increased by approximately 20%, and thus the pressure drop in the air path through the fuel cell 2 and, in consequence, the power requirement for air compression as well, are also increased by approximately 20%. The air ratio $^A m$ in this case is defined as the ratio of the oxygen quantity in the air to the oxygen requirement (stoichiometric). The power requirement of the gas compressor 36 for the recirculated exhaust-gas quantity is also added to this. The gas compressor 36 only has to compensate for a small air-pressure difference in order to compress the recirculated exhaust gas again to the input air pressure of the air gas space 8. In this case a part of the power consumed by the air compressor 38 is applied by means of the exhaust-gas relief turbine 32, which is driven by the remaining exhaust-gas quantity.

Without this recirculation of the exhaust-gas air, a non-illustrated gas moistener would have to be connected upstream of the air compressor 38 in order to avoid the PEM drying out on the cathode side. In this case, the dimensioning of that so-called membrane moistener would have to be carried out in accordance with the lowest system pressure, that is to say it would have to be matched to the maximum possible air quantity. Such a membrane moistener can be implemented technically but has a multiple of the volume of a stack configuration of fuel cells 2 and a relatively high production price. The disadvantages which are linked to the use of a membrane moistener would thus preclude the use of a PEM fuel cell 2.

Figure 2:
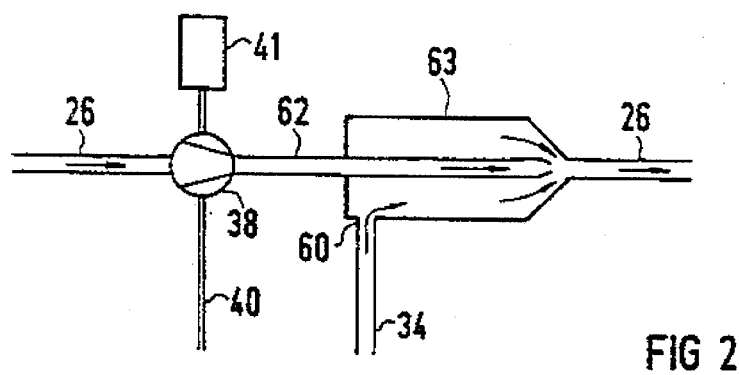
FIG. 2 is a fragmentary view of an opening of a recirculation line into an air supply line, in which the opening is modified as compared to FIG. 1.

FIG. 2 shows an alternative possibility for introducing recirculated air into the air supply line 26 and in so doing compensating for the pressure difference. For this purpose, an air jet compressor 63 is installed at an opening point for the recirculation line 34 in such a way that an induction connecting piece 60 thereof is connected to the recirculation line 34 and a compressed-air supply connecting piece 62 thereof is connected to the air compressor 38. This results in the recirculated gas mixture being sucked in by the compressed air flowing to the fuel cell 2 in accordance with the instantaneous setting of the adjusting element 30.

The recirculation of exhaust gas which occurs on the cathode side according to the invention permits the elimination of a voluminous and costly air moistener with little expenditure and thus creates a precondition for reducing the production costs for fuel cells 2 on the basis of a PEM 14.

A construction which is only slightly changed from that in FIG. 1 can also permit the elimination of separate air moisteners on the cathode side of the fuel cell in the case of an alkaline or acidic fuel cell. Overall, the measures proposed according to the invention would also lead to an improvement in the overall efficiency of the fuel cell in the case of alkaline or acidic fuel cells. The overall efficiency of the exemplary embodiment which is disclosed in FIG. 1 is over 60% in partial-load operation, for example at a load factor of 20%.

I claim:

1. A method for moistening an electrolyte of a low-temperature fuel cell, which comprises:

at least partially recirculating exhaust gas occurring on a cathode side of a fuel cell into the cathode of the fuel cell; and setting a part of the exhaust gas being recirculated by an adjusting element in proportion to a power output of the fuel cell.

2. A method for moistening an electrolyte of a polymer-electrolyte membrane fuel cell, which comprises:

at least partially recirculating exhaust gas occurring on a cathode side of a fuel cell into the cathode of the fuel cell; and setting a part of the exhaust gas being recirculated by an adjusting element in proportion to a power output of the fuel cell.

3. A low-temperature, moistened-electrolyte fuel cell assembly, comprising:

a fuel cell having an anode on an anode side and a cathode on a cathode side;

an exhaust-gas line connected to said cathode side of said fuel cell for carrying exhaust gas;

a recirculation line connected to said exhaust-gas line for recirculating at least a part of the exhaust gas occurring on said cathode side into said cathode of said fuel cell; and an adjusting element being associated with said recirculation line for recirculating a part of the exhaust gas being adjustable in proportion to a power output of said fuel cell.

4. A low-temperature, moistened-electrolyte polymer-electrolyte membrane fuel cell assembly, comprising:

a fuel cell having an anode on an anode side and a cathode on a cathode side;

an exhaust-gas line connected to said cathode side of said fuel cell for carrying exhaust gas;

a recirculation line connected to said exhaust-gas line for recirculating at least a part of the exhaust gas occurring on said cathode side into said cathode of said fuel cell; and an adjusting element being associated with said recirculation line for recirculating a part of the exhaust gas being adjustable in proportion to a power output of said fuel cell.

5. The low-temperature fuel cell assembly according to claim 3, including an air supply line connected to said cathode side of said fuel cell, and a gas compressor through which said recirculation line opens into said air supply line.

6. The low-temperature fuel cell assembly according to claim 4, including an air supply line connected to said cathode side of said fuel cell, and a gas compressor through which said recirculation line opens into said air supply line.

7. The low-temperature fuel cell assembly according to claim 5, including an air compressor disposed in said air supply line upstream of said opening of said recirculation line into said air supply line, as seen in air flow direction in said air supply line.

8. The low-temperature fuel cell assembly according to claim 6, including an air compressor disposed in said air supply line upstream of said opening of said recirculation line into said air supply line, as seen in air flow direction in said air supply line.

9. The low-temperature fuel cell assembly according to claim 3, including an air supply line connected to said cathode side of said fuel cell, said recirculation line opening into said air supply line, a gas compressor disposed in said air supply line downstream of said opening of said recirculation line into said air supply line, and a restriction point disposed upstream of said opening of said recirculation line into said air supply line, as seen in air flow direction in said air supply line.

10. The low-temperature fuel cell assembly according to claim 4, including an air supply line connected to said cathode side of said fuel cell, said recirculation line opening into said air supply line, a gas compressor disposed in said air supply line downstream of said opening of said recirculation line into said air supply line, and a restriction point disposed upstream of said opening of said recirculation line into said air supply line, as seen in air flow direction in said air supply line.

11. The low-temperature fuel cell assembly according to claim 3, including an air supply line connected to said cathode side of said fuel cell, an air compressor disposed in said air supply line, an air jet compressor being supplied with compressed air from said air compressor and having an induction connecting piece, and a recirculation line opening into said induction connecting piece.

12. The low-temperature fuel cell assembly according to claim 4, including an air supply line connected to said cathode side of said fuel cell, an air compressor disposed in said air supply line, an air jet compressor being supplied with compressed air from said air compressor and having an induction connecting piece, and a recirculation line opening into said induction connecting piece.

* * * * *